United States Patent [19]

Moorman

[11] 4,343,854

[45] Aug. 10, 1982

[54] FLAME RETARDANT COMPOSITION

[75] Inventor: David S. Moorman, Houston, Tex.

[73] Assignee: Witco Chemical Corporation, New York, N.Y.

[21] Appl. No.: 243,018

[22] Filed: Mar. 12, 1981

[51] Int. Cl.$^3$ .............................................. C09K 3/28
[52] U.S. Cl. ..................................... 428/290; 428/95; 428/921; 524/466
[58] Field of Search ................ 260/29.6 ME; 252/8.1; 428/95, 290, 920, 921

[56] References Cited

U.S. PATENT DOCUMENTS 3,877,974  4/1975  Mischutin .

OTHER PUBLICATIONS

John W. Lyons, "The Chemistry and Uses of Fire Retardants", 1970 ed., p. 21.

Primary Examiner—James J. Bell
Attorney, Agent, or Firm—Albert L. Gazzola; Morton Friedman

[57] ABSTRACT

A liquid flame retardant composition consisting essentially of:
- A. A polybrominated diphenyloxide containing about 4 to 9 nuclearly substituted bromine atoms and;
- B. A $C_{10-24}$ aliphatic hydrocarbon polybrominated and polychlorinated to contain about 10 to 50 weight percent of bromine and about 5 to 60 weight percent of chlorine; the weight ratio of A to B ranging from about 5:1 to 1:5, optionally combined with a flame-retardant synergist such as antimony oxide.

10 Claims, No Drawings

FLAME RETARDANT COMPOSITION

FIELD OF INVENTION

This invention relates to flame retardant compositions and more particularly to an improved non-phosphorus-containing flame retardant composition liquid at ambient temperatures and useful with or without flame retardant synergists for rendering other materials and articles flame retardant by admixture therewith or treatment thereof.

BACKGROUND AND DISCUSSION

The importance of imparting flame retardant properties to building materials, textiles, paper and other fibrous materials, and in fact any flammable object or composition in the interests of human safety, economy and energy conservation has of course long been recognized. Recently, however, the importance of such flame retardant properties has been augmented and in many instances made mandatory by legislation setting elevated standards of fire retardancy for many materials such as bedding, draperies and textiles.

It is usually not practical, and often not possible, to make flammable materials completely fire-proof. This is particularly true of textiles, paper and other materials composed of fibers which have such relatively large surface areas available for oxidation. Steel is normally considered nonflammable, but one of the most popular types of tinder used by Boy Scouts is fine steel wool, the enormous surface area of which promotes its rapid oxidation (burning). Presently available material and synthetic organic fibrous materials are of course even more flammable and will under some circumstances burn depite the use of any known expedients intended to render them non-flammable. Such expedients are thus properly referred to as directed towards reducing flammability, and terms such as flame resistant, flame retardant, and self-extinguishing are properly used rather than fireproof and nonflammable.

It will accordingly be understood that as employed herein, the term "fire retardant" or equivalent refers to a composition or property thereof which "enables a material to resist burning when exposed to a relatively low-energy ignition source, such as cigarette, match, candle, cigarette lighter, or stove burner." "Flame Retardants—government regulations and public emphasis on safety provide the importance for an expanding industry," Chemical and Engineering News, Apr. 24, 1978, pp. 22–36, 23.

May chemicals have been heretofore proposed and/or used as flame retardants. Probably one of the best known of these chemicals has been tris-(2,3-dibromopropyl)phosphate, commonly referred to as Tris. Although previously widely employed as a flame retardant for children's sleepwear, such use has been interdicted as a result of tests indicating that this compound might have carcinogenic properties.

A wide variety of other known fire retardant chemicals and combinations thereof have been and are being employed to both fill the gap left by the interdicted Tris and for all the other known uses for such chemicals but for the most part they have not been entirely satisfactory and have been subject to one or more deficiencies, for example with respect to optimal stability in storage and/or use, viscosity, water resistance and flame and/or smoke retarding properties of the flammable materials being treated, and the like. Thus, some commonly employed flame retardants such as the ammonium and alkali metal (sodium, potassium, etc.) chlorides, bromides, borates, arsenates, phosphates, polyphosphates, phosphonates, polyphosphonates and the like are more or less water soluble whereby flammable materials treated therewith or otherwise containing the same have significantly non-durable flame retardancy because of leaching under the influence of laundering, rain and other environmental conditions.

U.S. Pat. No. 3,877,974 issued Apr. 15, 1975, to V. Mischutin and assigned to the White Chemical Corporation (which markets Caliban® F/R P®-44 fire retardant) is directed to a method of rendering flammable textile materials flame retardant by treatment with an aqueous latex containing an aqueous dispersion of a fire retardant composition consisting essentially of a brominated organic aromatic or cyclic compound and a metallic oxide, such as antimony oxide, both of which are finely divided, substantially totally insoluble in water and solid at room (e.g. ambient) temperature. This method, although said to deposit on the textile an effective amount of flame retardant durable to laundering and dry cleaning, is disadvantageous in several respects. The solid particles of fire retardants in the aqueous dispersion tend to agglomerate and/or sedimentate, causing numerous problems such as instability in shipping and storage, clogging of pipes, valves, and spray nozzles, etc. The aqueous dispersion is sensitive to low temperature conditions, i.e. freezing conditions in shipping, storage and use. The aqueous dispersion is for some purposes "overformulated", e.g. antimony oxide is not needed to render polyester fibrous material flame retardant. The aqueous dispersion of flame retardant compounds cannot as such be employed for making intrinsically flame retardant materials, e.g. by inclusion in non-aqueous solid or liquid polymer compositions for coating, spinning into fibers and filaments, potting, encapsulating, molding or casting into sheets, foams, and other solid articles, etc. The low watery viscosity of the aqueous dispersion renders it unsuitable for many applications requiring relatively higher viscosities to prevent undesirable penetration as in back treatment or coating of carpets, garments, drapes and the like. Flammable materials treated with these high melting solid fire retardant chemicals do not generally have the flexibility required in many uses at ambient, and especially at relatively low, temperatures, such as wire coatings and laminations, apparel, and the like. The halogen content of this patented composition is not as high as could be desired and is further limited to bromine atoms.

DESCRIPTION OF THE INVENTION

It is an object of this invention to provide fire retardant compsitions, articles, methods and means which will not be subject to one or more of the above-described disadvantages and deficiencies. Other objects and advantages will appear as the description proceeds.

The attainment of these objects is made possible by my invention which comprises the provision of a liquid flame retardant composition consisting essentially of (A) polybrominated diphenyloxide containing about 4 to 9 nuclearly substituted bromine atoms, and (B) a $C_{10-24}$ aliphatic hydrocarbon polybrominated and polychlorinated to contain about 10 to about 50 wt. % of bromine and about 5 to about 60 wt. % of chlorine, the weight ratio of (A) to (B) ranging from about 5:1 to about 1:5. Components (A) and (B) are individually known types of flame retardant compounds, but they have been found to be peculiarly mutually cooperative and coactive in the above-defined compositions of this invention. The resulting liquid composition is superior in many ways over each of the two components (A) and (B) per se and is thus adaptable more readily and effectively in applications requiring the addition of a liquid flame suppressant additive product. Component (A) cannot be emulsified but the inventive composition combining (A) and (B) is readily emulsifiable in water permitting facile use in latex polymer application areas. Component (B) is compatible in many polymer systems and acts as a bridging agent to enhance compatability of component (A). When flammable material containing or treated with the compositions of this invention are subjected to flammatory conditions, component (B) functions as an activator or potentiator, its aliphatically bound halogen atoms being released first and activating or catalyzing release of the aromatically bound bromine atoms in component (A). The composition does not volatilize from the flammable materials treated therewith when the end use of these materials necessitates long-term exposure to temperature above 120° F., and is in some cases an effective plasticizer for synthetic polymers.

Being non-aqueous, the fundamental (A) and (B) component combination of this invention is not subject to the several deficiencies enumerated above which are inherent in aqueous dispersions and compositions. The viscosity range of such combination is suitable for many applications. Being liquid at ambient temperatures and devoid of high melting solid particles, such combination is not subject to agglomeration and sedimentation, and flammable materials treated therewith or containing the same retain flexibility at ambient and especially low temperatures. Such combination has a relatively higher bromine activity in addition to chlorine activity, resulting in enhanced flame retardant activity, weight for weight, as compared with the flame retardant system described in U.S. Pat. No. 3,877,974, thereby enabling the use of lower proportions of the said combination to achieve equivalent results in flame retardancy. Such lower proportions, in addition to providing an economic advantage, are highly desirable in many applications to minimize alteration of the physical and chemical characteristics of the flammable material being made flame retardant. There is some evidence of synergism between the two halogens in component (B) and with the bromine in component (A).

The polybrominated diphenyloxide (component A) in the compositions of this invention, and methods for its production are well known. It has the formula:

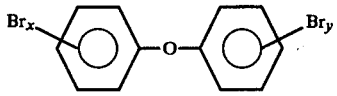

wherein the sum of x and y ranges from about 4 to 9. The preferred pentabromodiphenyloxide (x+y is 5), with M.W. of 564.7 and 70.8% bromine content is a clear viscous liquid with specific gravity of 2.28 gm/ml at 25° C. Its viscosity cps Brookfield, at 35°, 40°, 50° and 60° C. is respectively 150,000, 50,000, 8,000 and 1,500. It is substantially non-volatile and insoluble in water and methanol, but completely soluble or miscible in methylene chloride, toluene, methylethylketone, acetone, benzene and carbon tetrachloride.

The non-volatile, water insoluble polybrominated polychlorinated $C_{10-24}$ aliphatic hydrocarbon (component B) in the compositions of this invention is similarly produced in well known manner. Preferably, a $C_{10-24}$ paraffin or alpha-olefin preferably straight chain is first brominated, as with elemental bromine, and then chlorinated, as with elemental chlorine, to yield the preferred product containing about 18 to about 25 weight percent of bromine and about 26 to about 33 weight percent of chlorine. The use of an alpha-olefin as the precursor aliphatic hydrocarbon is preferred. An especially preferred embodiment of component B is employed in Example I below.

Component (A) and component (B), according to the invention, are mixed together, desirably with the aid of heat, in weight ratios of about 5:1 and 1:5, preferably about 1:1, and optionally including a stabilizer in small amounts such as about 0.5 to about 2 wt. %, to yield a clear viscous liquid. Preferably, components (A) and (B), and their proportions in the composition, are such as to yield a liquid having a bromine content of about 40 to about 60, preferably about 45 to about 47 weight percent, a chlorine content of about 10 to about 30, preferably about 15 to about 17 weight percent and an SUS viscosity at 210° F. of about 50 to about 70, preferably about 55 to about 60, or a Brookfield viscosity (Brookfield Viscosimeter Model LVT at 25° C. with Spindle No. 4, average of values at 6, 12 and 30 RPM) of about 1600 to about 1950, preferably about 1780 to about 1800 cps.

If the above-described compositions of this invention are intended for emulsification in an aqueous medium such as a latex, a small amount of a surfactant, e.g. about 0.1 to about 3 wt. %, may desirably be added. The surfactant may be any conventional oil-in-water surface active agent, of anionic, nonionic, cationic, or amphoteric type, depending upon the properties, functions and purposes of the aqueous medium.

According to a further embodiment, the above-described compositions of this invention may be further improved or synergized with respect to flame-retardancy by admixture of 1 part by weight of a metal- or phosphorus-containing flame retardant synergist with about 1 to about 5 parts by weight of such composition. Such synergism is well known in the art. For example, on page 21 of "The Chemistry and Uses of Fire Retardants" (1970 edition) by John W. Lyons, it is stated:

"There are true synergisms in the phosphorus-halogen and antimony trioxide-halogen systems. Some examples are:

| Polyolefins | 5% P ≅ 0.5% P + 7% Br ≅ 20% Br |
|---|---|
| Acrylates | 5% P ≅ 1% P + 3% Br ≅ 16% Br |
| Polyacrylonitrile | 10-12% Br ≅ 2% $Sb_4O_6$ + 6% Br |
| Epoxies | 13-15% Br ≅ 3% $Sb_4O_6$ + 5% Br |

Antimony trioxide alone is ineffective."

According to one theory, the synergist reacts with halogenated organic material, e.g. components (A) and (B) herein, at the flame temperatures inducing its decomposition and liberating a nonflammable gas which forms a blanket around a flaming substrate, displacing the oxygen from the vicinity of the same thus impeding the oxidation process of the combustion.

Metal-containing flame-retardant synergists useful herein are usually water-insoluble inorganic salts or oxides of metals such as Al, Ga, Si, Ge, As, Bi, Ti, Zr, B, Zn, and especially Sb. Phosphate salts are additionally effective in also providing phosphorus-induced synergism. Metal combinations may be employed such as zinc borate. The oxides, in their oxidized form, are preferred, especially antimony oxide. These metalic synergists are employed in finely divided particulate form, e.g. with submicron to about 2 microns average particle size.

The preferred antimony oxide is readily available, as the trioxide ($Sb_2O_3$ or $Sb_4O_6$), in average particle size of about 1 to 2 microns, and as colloidal pentoxide ($SbO_5$), available from Nyacol, Inc., Ashland, Mass., U.S.A., with an average particle size of about 15-30 millimicrons (150-300 angstroms) which is 1/100 the size of the trioxide pigment. The surface area of the colloidal particles is about 100 times the area of the same weight of the trioxide pigment, enabling use of ½ to ⅓ the weight of the trioxide to yield equivalent flame retardancy. Further, use of the colloidal particles, which do not settle out or interact with light in liquid media, enables the provision of stable, essentially clear or translucent, liquid synergized flame retardant compositions containing component (A) and (B) according to the instant invention. Other advantages include increased uniformity and ease of compounding and application, better impregnation of porous flammable substrates, etc.

Phosphorus-containing flame retardant synergists useful herein, apart from the aforementioned metal phosphates, are generally water-soluble organic polymers or monomeric compounds which are per se flame retardants. A number of the relatively lower molecular weight monomeric organic phosphate and phosphonate esters also function as plasticizers for polymeric compositions. Examples of phosphorus-containing flame retardant synergists include:

tris(2,3-dibromopropyl)phosphate
tris(1,2-dibromoethyl)phosphate
tributyl phosphate
triphenyl phosphate
tricresyl phosphate
tris(chloroethyl)phosphate
tris(1,2-dichloroethyl)phosphate
tris(1,2,3-trichloropropyl)phosphate
tris(1,2,3-tribromopropyl)phosphate
tris(1-chloromethyl-2-bromoethyl)phosphate
tris(1-bromo-3-chloroisopropyl)phosphate
tris(1-bromo-4-chlorobutyl)phosphate
tris(ethyleneimine)phosphate
tris(2-tribromomethylethyl)phosphate
phenyl, octyl or butyl phosphine oxides
bis(hydroxyethyl)phenyl phosphonate
di(2,2,3,3-tetrabromopropyl)allyl phosphate
N-methylolated tris(2-carbamoylethyl)phosphine oxide
hydroxymethylated dialkylphosphonoacetyl ureas
poly(octachlorobiphenyl phenyl phosphonate)

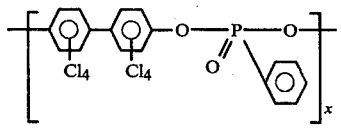

poly(tetrabromobisphenol A phenyl phosphonate)

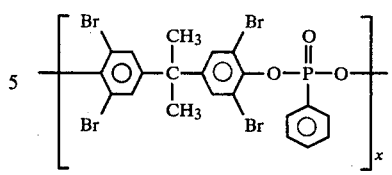

poly(ethyl phenyl phosphonate)

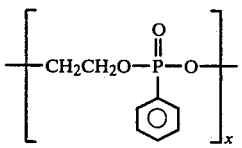

chloroethyl ester of the poly(phosphite-phosphonate) of the formula

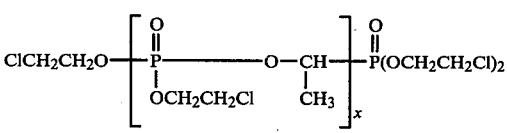

Monsanto's Phosgard® C-22-R is a flame retardant polymer of the latter formula in which x is such that it is a water insoluble clear viscous liquid, viscosity 40 to 60 Centistokes at 98.9° C., refractive index 1.492–1.496 at 25° C., a 5° C. pour point, specific gravity (25°/25° C.) of 1.435, density ca. 11.9 lbs./gal. at 25° C., acidity 5.0 meq/100 gm. max., 27% chlorine, and 15% phosphorus.

It will be understood that the metal-containing and/or phorphorus-containing flame retardant synergist may be supplied in admixture with the fundamental component (A) and (B) combination, or may be subsequently included in the latex or other flammable material to be made flame retardant with such combination.

As indicated above, intrinsically flame retardant solid articles of any desired size or shape may be prepared by inclusion of suitable proportions of the flame retardant compositions of this invention in non-aqueous solid or liquid polymeric compositions for coating, spinning, potting, encapsulating, molding, casting or the like into sheets, coatings, laminations, fibers, filaments, foams, spheres, blocks, toys, household, structural and industrial objects and the like. The polymer should of course be film-forming or solidifiable under ambient conditions and may be natural or synthetic, organic or inorganic. Such intrinsically solid flame retardant articles, objects or materials may generally contain about 0.3 to about 20 parts by weight of the polymer per part by weight of the flame retardant compositions of this invention. substantially any known polymer may provide the basis for such solid articles, objects or materials. For example, in addition to the polymers discussed below as suitable in latices (aqueous emulsions), special applications may call for the use of water soluble polymers for the production of flame resistant water soluble solid articles, objects or materials. Also included in this category are organic solvent solutions, dispersions or emulsions of these polymers, as in aerosols, paints, lacquers, varnishes, plastisols, organosols, and the like. The flame retardant compositions of this invention (components (A) and (B) combination) are insoluble in water and lower alcohols, soluble or miscible in aliphatic, aromatic and chlorinated hydrocarbons, esters, ketones and higher alcohols.

A very important use of the flame retardant compositions of this invention is as an additive to an aqueous emulsion of a film-forming water-insoluble polymer, commonly referred to as a latex. Latices may be prepared by emulsification in an aqueous medium of the previously prepared polymer, but more usually by aqueous emulsion polymerization of the precursor monomer or mixture of monomers, generally in the presence of a catalyst. The latices for use herein may contain (generally in concentrations of about 20% to about 65% by weight) substantially any water insoluble polymer, which term is inclusive of homopolymers, copolymers of two or more monomers graft and cross-linked copolymers, and mixtures thereof. By way of example of such water insoluble polymers, mention may be made of those derived from ethylene, propylene, isobutylene, neoprene, isoprene, butadiene, styrene, vinyl chloride, vinylidene chloride, vinyl fluoride, vinyl acetal, vinyl acetate, vinyl acetate butyrate, vinyl pyridine, vinyl pyrrolidone, acrylic acid, methacrylic acid, maleic acid, fumaric acid, itaconic acid, the alkyl, hydroyalkyl and aminoalkyl esters of such acids such as methyl and ethyl methacrylate, beta-hydroxypropyl acrylate and N-dimethylaminoethyl methacrylate, the amides of such acids such as acrylamide and N-methylolacrylamide, acrylonitrile, methyl vinyl ether, cellulose nitrate, cellulose acetate, ethyl cellulose, tetrafluoroethylene, cellulose acetobutyrate, alkyds, epoxies, epoxyphenolics, chlorinated, isomerized and natural rubbers, vinyl toluene, silicones, urethanes, N-methylolated-urea, -melamine and -benzoguanamine and the like, rosin and rosin derivatives, ester gum, terpenes, polymerizable amide, ester and ketone derivatives.

Other usual components ordinarily present in minor proportions in these latices include fillers such as glass bubbles, microbeads, and fibers, calcium carbonate, flour, cotton floc, sand, mica, clay, hydrated alumina and asbestos, all in finely divided form, water-soluble or dispersible thickeners or protective colloids such as sodium carboxymethyl cellulose, polyvinyl alcohol, sodium alginate, sodium polyacrylate, methoxy and ethoxy cellulose, natural gums, Cab-O-Sil, Carbopols and the like, stabilizers, pigments, plasticizers, catalysts, surfactants, fungicides and other preservatives, defoamers, crosslinking agents and the like.

The flame retardant compositions of this invention are mixed into the latex in proportions of about 1 part per about 0.3 to about 100 parts by weight of the polymer which, apart from its normal coating or bonding function, binds the flame retardant composition to the flammable substrate.

The flame retardant latex is applied to any desired flammable substrate in the proportions effective to render such substrate flame retardant, the amount of polymer deposited being sufficient to bind an effective amount of the flame retardant to the substrate. Although the substrate may be any solid porous or non-porous surface, fibrous substrates are peculiarly subject to damage or destruction by fire because of the relatively enormous surface areas they present and hence derive special benefit by treatment therewith of the flame retardant latices. The fibrous material may be individual or bulk fibers or filaments, woven, felted, twisted, knotted or otherwise assembled, and may be natural or synthetic, organic or inorganic. Articles prepared wholly or partially from fibrous material may be coated, impregnated or otherwise treated such as garments, upholstery, draperies, wall coverings of paper or fabric, carpeting (especially backing), fiberfil for insulation, air filters, shoddy, bedding, tents, awnings, tarpaulins and the like.

Any chemical type of fibrous material may be made flame-retardant with the flame-retardant latices of this invention such as cotton, jute, hemp, ramie, paper, wood, linen, wool, silk, regenerated cellulose, cellulose acetate, polyethylene, polypropylene, nylon 66, polyacrylonitrile and modacrylics containing about 35% to about 85% polyacrylonitrile, polyvinyl chloride, polyvinylidene chloride, polyvinyl acetate, polyvinyl acetate/chloride, polymethyl acrylate and methacrylate, polyesters (glycol/terephthalates), glass fiber and the like, and mixtures thereof.

The fibrous material may be coated, impregnated or otherwise treated with the flame-retardant latices of this invention such as by spraying (aerosol, pump, etc.), roller coating, knife coating, calendering, laminating, printing, padding, or simple immersion or the like, usually followed by drying and then curing, as by heating at about 220° F. to about 350° F. for about 0.5 to about 5 minutes. Sufficient latex is applied to deposite a flame-retarding amount of the flame-retardant compositions of this invention, such amount being bound to the fibrous material by the polymeric content of the latex. Usual proportions may range from about 5% to about 50% of the flame-retardant compositions owf. (on the weight of the fiber) depending upon the chemical and physical characteristics of the fibrous material, its intended function, etc. Similarly, the viscosity of the latex may vary widely depending upon whether a thorough impregnation, or a substantially non-penetrating adherent coating is desired. For example, for application to carpet backing, the latex should preferably be fairly thixotropic and exhibit a relatively high viscosity to permit even application of the latex across the textile backing without undue penetration therethrough. Thus, when the scrim of a carpet backing is laminated against the coating of latex, the impregnating latex coating has a sufficiently high viscosity so as not to extrude through and between the fibers of the jute backing and wet the tuft fibers of the carpet. Generally, in such cases, the latex should have a viscosity of about 6500 to 20,000 cps., preferably about 8,000 to about 13,000 cps., at 70° F. The latex viscosity is readily controlled by routine procedures employing suitable types and proportions of polymers, thickeners and other solids, control of pH (generally to values of about 7.5 to about 10), etc.

The following examples are only illustrative of preferred embodiments of the invention and are not intended to be limited thereto. All amounts and proportions referred to herein and in the appended claims are by weight unless otherwise indicated.

EXAMPLE I

Polybrominated polychlorinated hexadecenel having about 22 wt. % of bromine, about 30 wt. % of chlorine, and an SUS viscosity (Saybolt Universal System) of about 60 to 70 is employed as component B. Fifty (50) parts of pentabromodiphenyloxide (component (A)) is heated to 50°–75° C. and mixed while stirring with 49 parts of the above component (B). One (1) part of Weston DHOP stabilizer (Borg-Warner—polydipropylene glycol phenyl phosphite) is then added and the product is stirred until clear.

The resulting flame-retardant composition of this invention may be employed in conventional manner, including the uses described hereinabove, for rendering flammable material and articles flame retardant.

EXAMPLE II

Into 10 parts of the product of Example I are mixed with stirring 5 parts of antimony trioxide, average particle size 1–2 microns. The resulting synergized flame-retardant composition of this invention may be employed like the product of Example I, in most cases with further improved flame retardancy results.

EXAMPLE III

The procedure of Example II is repeated using 3 parts of colloidal antimony pentoxide instead of the 5 parts of antimony trioxide. The product is substantially similar in performance to the product of Example II but is a stable translucent liquid with no agglomeration, separation or sedimentation.

EXAMPLE IV

Into 15 parts of the product of Example I are mixed with stirring 5 parts of finely divided zinc borate. The resulting synergized flame-retardant composition of this invention may be employed like the product of Example I, in most cases with further improved flame retardance results.

EXAMPLE V

The procedure of Example IV is repeated but with substitution of the zinc borate by Phosgard ® C-22-R (Monsanto P- and Cl-containing flame retardant liquid described hereinabove). The product is somewhat similar in performance to the product of Example IV but is a stable clear liquid showing no agglomeration, separation or sedimentation.

EXAMPLE VI

In the following Table 1, the flame retardancy of the instant component (A)/component (B)/antimony trioxide system is compared with that of a further chlorinated component (B)/antimony trioxide system in Union Carbide BX-3160 acrylic latex 40% solids. In each instance, the antimony trioxide and either the component (A)/component (B) system (product of Example I above) or the chlorinated component (B) are sequentially thoroughly mixed into the latex.

For the Underwriters Laboratories No. 94, 3rd Edition, vertical burn test, a 25 mls thick coating of each of the flame-retardant-containing latices on a glass backing is oven dried at 300° F. for 15 minutes, conditioned at room temperature, and tested.

For the ASTM-D-2863-77 Oxygen Index Test, a 30 mils thick coating of each of the same latices is similarly prepared and tested.

TABLE 1

|  | Example | |
| --- | --- | --- |
|  | Comparative | VI |
| BX-3160 Latex | 100 parts | 100 parts |
| Chlorinated Component (B)* | 15 parts |  |
| Product of Example I |  | 10 parts |
| Antimony trioxide | 5 parts | 5 parts |
| Oxygen Index | 29 | 29 |
| UL-94 | Failed | Passed |

*Component (B) further chlorinated to a 40% chlorine content, 20% bromine content, and SUS viscosity of 170 at 210° F.

When the flame retardant-containing latex of this Example VI is applied to carpet backing, as by knife coating, roller coating or the like, and cured, the treated carpet exhibits substantial resistance to flame.

EXAMPLES VII–XI

TABLE 2

|  | Example | | | | |
| --- | --- | --- | --- | --- | --- |
|  | VII | VIII | IX | X | XI |
| Latex, 50% solids* | 100 | 100 | 100 | 100 | 100 parts |
| Sodium polyacrylate thickener | 3 | 3 | 3 | 3 | 3 parts |
| 30% NH4OH aqueous, to pH 7.5–8.5 | 0.5–1 | 0.5–1 | 0.5–1 | 0.5–1 | 0.5–1 parts |
| Product of Example I | 20 | 20 | 25 | 25 | 15 parts |
| Phosgard ® C-22-R | 10 | 10 | 5 | 5 | 5 parts |
| Non-Fused, % add-on owf. | 95% |  | 100% |  | 90% |
| Back-Fused, % add-on owf. |  | 75% |  | 80% |  |

*Acrylic or polyvinyl acetate or the like, of intermediate hardness ($T_g = -5°$ C. to $+7°$ C.) for desired melting and flow characteristics in burning samples.

Each of the above formulations is a non-freeflowing backcoating product with a mayonnaise-like consistency. The formulation is applied to the back of non-woven tufted fibrous polypropylene wall covering, with sufficient pressure to achieve ample penetration without wetting the outside tufts, dried and back-fused or not as indicated. Fusion or heat curing is preferred to promote optimal penetration and fixation. Inclusion of inert solids and fillers is generally not advisable in these and other fibrous treating formulations because they tend to act as flow inhibitors and wicking sites during combustion.

All the resulting treated wall coverings pass the NFPA vertical burn test.

EXAMPLE XII

Similarly acceptable fire retardancy results are obtained when the latices in the foregoing examples are respectively replaced by E-779 Rohm and Haas polyvinylacetate latex, Rhoplex TR-407 Rohm and Haas acrylic latex, Ucar 822 Union Carbide SBR latex, 4125 Amsco SBR latex, Rohm and Haas HA-24 latex, and Union 76 Resin 3077 latex.

This invention has been disclosed with respect to certain preferred embodiments, and it will be understood that modifications and variations thereof obvious to those skilled in the art are to be included within the spirit and purview of this application and the scope of the appended claims.

The embodiments of the invention in which an exclusive property and privilege is claimed are defined as follows:

1. A substantially non-aqueous liquid flame retardant composition consisting essentially of
   (A) polybrominated diphenyloxide containing about 4 to 9 nuclearly substituted bromine atoms, and
   (B) a $C_{10-24}$ aliphatic hydrocarbon polybrominated and polychlorinated to contain about 10 to about 50 wt. % of bromine and about 5 to about 60 wt. % of chlorine;

the weight ratio of (A) to (B) ranging from about 5:1 to about 1:5.

2. A composition according to claim 1 wherein (B) contains about 18 to about 25 wt. % of bromine and about 26 to about 33 wt. % of chlorine.

3. A composition according to claim 1 wherein (A) contains about 5 to about 6 bromine atoms, (B) is an alpha olefin of about 16 carbon atoms polybrominated and polychlorinated to contain about 22 wt. % of bromine and about 30 wt. % of chlorine, and the weight ratio of (A) to (B) is about 1:1.

4. A synergized flame retardant composition comprising about 1 to about 5 parts by weight of a composition as defined in claim 1 and 1 part by weight of a metal or phosphorus-containing flame retardant synergist or a mixture thereof.

5. A composition according to claim 4 wherein said synergist is antimony oxide.

6. A flame retardant composition containing about 0.3 to about 20 parts by weight of a natural or synthetic polymer and 1 part by weight of a composition as defined in claims 1, 2, 3, 4 or 5.

7. An aqueous latex comprising a composition as defined in claim 6.

8. A flammable substrate treated with an effective flame-retardant amount of a latex as defined in claim 7.

9. A flammable fibrous substrate treated with an effective flame-retardant amount of a latex as defined in claim 7.

10. A solid flame-retardant article comprising a composition as defined in claim 6.

* * * * *